US 6,669,089 B2
Dec. 30, 2003

(12) United States Patent
Cybulski et al.

(54) RADIO FREQUENCY IDENTIFICATION SYSTEMS FOR ASSET TRACKING

(76) Inventors: Eric R. Cybulski, P.O. Box 33427, St. Paul, MN (US) 55133-3427; Francis D. Dehn, P.O. Box 33427, St. Paul, MN (US) 55133-3427; Robert C. Francis, P.O. Box 33427, St. Paul, MN (US) 55133-3427; Peter B. Hogerton, P.O. Box 33427, St. Paul, MN (US) 55133-3427; Mary C. Kallestad, P.O. Box 33427, St. Paul, MN (US) 55133-3427; Karl M. Kropp, P.O. Box 33427, St. Paul, MN (US) 55133-3427; James P. McGee, P.O. Box 33427, St. Paul, MN (US) 55133-3427; Sai-Kit Tong, P.O. Box 33427, St. Paul, MN (US) 55133-3427

( * ) Notice: Subject to any disclaimer, the term of this patent is extended or adjusted under 35 U.S.C. 154(b) by 0 days.

(21) Appl. No.: 09/992,711

(22) Filed: Nov. 12, 2001

(65) Prior Publication Data

US 2003/0089771 A1 May 15, 2003

(51) Int. Cl.⁷ .............................................. G06F 17/60
(52) U.S. Cl. .................. 235/385; 235/383; 235/384
(58) Field of Search ........................ 235/383, 384, 235/385

(56) References Cited

U.S. PATENT DOCUMENTS

| 4,471,345 A | 9/1984 | Barrett, Jr. ............... 340/572 |
|---|---|---|
| 4,688,026 A | 8/1987 | Scribner et al. ........... 340/572 |
| 4,773,807 A | 9/1988 | Kroll et al. ............... 414/282 |
| 4,827,395 A | 5/1989 | Anders et al. ............. 364/138 |
| 4,862,160 A | 8/1989 | Ekchian et al. ........... 340/825 |
| 4,990,841 A | 2/1991 | Elder ..................... 318/587 |
| 5,019,815 A | 5/1991 | Lemelson et al. .......... 340/933 |
| 5,063,380 A | 11/1991 | Wakura .................... 340/825 |
| 5,113,349 A | 5/1992 | Nakamura et al. .......... 364/478 |
| 5,151,684 A | 9/1992 | Johnsen ................... 340/572 |

(List continued on next page.)

FOREIGN PATENT DOCUMENTS

| BE | 1005103 A3 | 4/1993 | |
|---|---|---|---|
| DE | 43 41 880 A1 | 6/1995 | ........... G07C/11/00 |
| DE | 44 39 914 A1 | 5/1996 | ........... B65D/23/08 |
| DE | 295 12 791 U1 | 8/1996 | ........... G06F/19/00 |
| DE | 200 04 869 U1 | 9/2000 | ........... B65G/37/02 |
| EP | 0 450 212 A1 | 10/1991 | ........... G06F/15/24 |
| EP | 0 494 114 A2 | 7/1992 | ........... G07C/9/00 |
| EP | 0 585 132 A1 | 3/1994 | ........... G01S/13/78 |
| EP | 0 615 136 A2 | 9/1994 | ........... G01S/13/02 |
| EP | 0 689 161 A2 | 12/1995 | ........... G06K/17/00 |

(List continued on next page.)

OTHER PUBLICATIONS

Gibilisco et al. Encyclopedia of Electronics, 2ⁿᵈ Ed. 1990 "Multiplex".*
IDSystems website article entitled "RFID: What's It Worth to You?" Sep. 1999 (4 pgs.).
Texas Instruments RFID Products website "Forging New Pathways, Making New Connections" Case Study—Protecting Valuable Products During Distribution —2000 (2 pgs).

(List continued on next page.)

*Primary Examiner*—Thien M. Le
*Assistant Examiner*—Daniel A. Hess
(74) *Attorney, Agent, or Firm*—Melissa E. Buss

(57) ABSTRACT

An asset tracking system is provided, having particular usefulness in connection with the interrogation of RFID-tagged pallets by a forklift equipped with one or more RFID reader antennas. A useful embodiment of an RFID-tagged pallet is described, along with other beneficial components of such a system.

24 Claims, 8 Drawing Sheets

U.S. PATENT DOCUMENTS

| | | | |
|---|---|---|---|
| 5,153,842 A | 10/1992 | Dlugos, Sr. et al. | 364/478 |
| 5,218,344 A | 6/1993 | Ricketts | 340/573 |
| 5,406,263 A | 4/1995 | Tuttle | 340/572 |
| 5,434,775 A | 7/1995 | Sims et al. | 364/403 |
| 5,448,220 A | 9/1995 | Levy | 340/539 |
| 5,457,629 A | 10/1995 | Miller et al. | 364/424 |
| 5,521,601 A | 5/1996 | Kandlur et al. | 342/44 |
| 5,539,775 A | 7/1996 | Tuttle et al. | 375/200 |
| 5,541,585 A | 7/1996 | Duhame et al. | 340/825 |
| 5,557,280 A | 9/1996 | Marsh et al. | 342/44 |
| 5,565,858 A | 10/1996 | Guthrie | 340/825 |
| 5,574,372 A | 11/1996 | Moritz et al. | 324/318 |
| 5,613,228 A | 3/1997 | Tuttle et al. | 455/127 |
| 5,635,693 A | 6/1997 | Benson et al. | 235/384 |
| 5,640,002 A | 6/1997 | Ruppert et al. | 235/472 |
| 5,648,765 A | 7/1997 | Cresap et al. | 340/825 |
| 5,662,048 A | 9/1997 | Kralj et al. | 108/56.3 |
| 5,682,142 A | 10/1997 | Loosmore et al. | 340/572 |
| 5,689,238 A | 11/1997 | Cannon, Jr. et al. | 340/568 |
| 5,689,239 A | 11/1997 | Turner et al. | 340/572 |
| 5,699,066 A | 12/1997 | Marsh et al. | 342/44 |
| 5,708,423 A | 1/1998 | Ghaffari et al. | 340/825 |
| 5,712,789 A | 1/1998 | Radican | 364/478 |
| 5,729,697 A | 3/1998 | Schkolnick et al. | 395/223 |
| 5,739,765 A | 4/1998 | Stanfield et al. | 340/825 |
| 5,745,036 A | 4/1998 | Clare | 340/572 |
| 5,774,876 A | 6/1998 | Woolley et al. | 705/28 |
| 5,780,826 A | 7/1998 | Hareyama et al. | 235/384 |
| 5,786,764 A | 7/1998 | Engellenner | 340/572 |
| 5,798,693 A | 8/1998 | Engellenner | 340/505 |
| 5,801,628 A | 9/1998 | Maloney | 340/568 |
| 5,804,810 A | 9/1998 | Woolley et al. | 235/492 |
| 5,821,513 A | 10/1998 | O'Hagan et al. | 235/383 |
| 5,850,187 A | 12/1998 | Carrender et al. | 340/825 |
| 5,853,846 A | 12/1998 | Clark et al. | 428/131 |
| 5,859,586 A | 1/1999 | Sasagawa et al. | 340/572 |
| 5,883,582 A | 3/1999 | Bowers et al. | 340/825 |
| 5,886,634 A | 3/1999 | Muhme | 340/572 |
| 5,887,176 A | 3/1999 | Griffith et al. | 395/750 |
| 5,920,261 A | 7/1999 | Hughes et al. | 340/572 |
| 5,920,287 A | 7/1999 | Belcher et al. | 342/450 |
| 5,926,110 A | 7/1999 | Downs et al. | 340/825 |
| 5,929,760 A | 7/1999 | Monahan | 340/572 |
| 5,933,354 A | 8/1999 | Shimada et al. | 364/478 |
| 5,936,527 A | 8/1999 | Isaacman et al. | 340/572 |
| 5,953,234 A | 9/1999 | Singer et al. | 364/478 |
| 5,959,568 A | 9/1999 | Woolley | 342/42 |
| 5,963,134 A | 10/1999 | Bowers et al. | 340/572 |
| 5,970,398 A | 10/1999 | Tuttle | 455/134 |
| 5,971,592 A | 10/1999 | Kralj et al. | 364/478 |
| 6,032,127 A | 2/2000 | Schkolnick et al. | 705/23 |
| 6,075,441 A | 6/2000 | Maloney | 340/568 |
| 6,076,023 A | 6/2000 | Sato | 700/214 |
| 6,081,237 A | 6/2000 | Sato et al. | 343/713 |
| 6,097,301 A | 8/2000 | Tuttle | 340/693 |
| 6,148,291 A | 11/2000 | Radican | 705/28 |
| 6,150,921 A | 11/2000 | Werb et al. | 340/10.1 |
| 6,154,137 A | 11/2000 | Goff et al. | 340/572 |
| D435,557 S | 12/2000 | Eisenberg et al. | D14/428 |
| 6,182,053 B1 | 1/2001 | Rauber et al. | 705/28 |
| 6,232,870 B1 | 5/2001 | Garber et al. | 340/10.1 |
| 6,335,686 B1 | 1/2002 | Goff et al. | 340/572 |
| 6,496,806 B1 * | 12/2002 | Horwitz et al. | 705/28 |

FOREIGN PATENT DOCUMENTS

| | | | | |
|---|---|---|---|---|
| EP | 0 748 083 A1 | 12/1996 | | H04L/12/28 |
| EP | 0 789 254 A2 | 8/1997 | | G01S/13/02 |
| FR | 2 697 801 | 5/1994 | | B65D/19/22 |
| GB | 2 302 088 A | 1/1997 | | B65G/1/137 |
| GB | 2 306 726 A | 5/1997 | | G08C/15/06 |
| GB | 2 333 207 A | 7/1999 | | G06K/7/10 |
| JP | 5-85545 | 4/1993 | | B65D/19/31 |
| JP | 8-108911 | 4/1996 | | B65G/1/137 |
| JP | 9-254983 | 9/1997 | | B65D/19/38 |
| JP | 10-250730 | 9/1998 | | B65D/19/00 |
| JP | 10-305997 | 11/1998 | | B66F/9/24 |
| JP | 10-338312 | 12/1998 | | B65G/1/137 |
| NL | 9400091 | 9/1995 | | A01K/11/00 |
| NL | 9401836 | 6/1996 | | G06K/19/00 |
| WO | WO 89/04016 | 5/1989 | | G06F/15/24 |
| WO | WO 96/16231 | 5/1996 | | E01F/9/00 |
| WO | WO 97/09687 | 3/1997 | | G06F/17/60 |
| WO | WO 97/50057 | 12/1997 | | G06M/1/12 |
| WO | WO 98/13800 | 4/1998 | | G08B/13/14 |
| WO | WO 98/23412 | 6/1998 | | B25B/13/00 |
| WO | WO 98/34204 | 8/1998 | | |
| WO | WO 99/05660 | 2/1999 | | G08B/13/14 |
| WO | WO 99/17767 | 4/1999 | | A61K/31/35 |
| WO | WO 99/17857 | 4/1999 | | A63H/33/10 |
| WO | WO 99/38136 | 7/1999 | | |
| WO | WO 99/67737 | 12/1999 | | G06K/7/00 |
| WO | WO 00/10144 | 2/2000 | | G08B/13/24 |
| WO | WO 01/10122 | 2/2000 | | G06K/1/18 |
| WO | WO 00/13123 | 3/2000 | | G06F/17/60 |
| WO | WO 00/19392 | 4/2000 | | G08C/17/02 |
| WO | WO 00/43944 | 7/2000 | | |

OTHER PUBLICATIONS

Texas Instruments RFID Products website "Forging New Pathways, Making New Connections" Case Study—Smart Pallet Systems —2000 (1 pg.).

ISIT website article entitled "Put Your Finger On Warehouse Productivity Gains" 1996–2001 (3 pgs.).

Article entitled "RFID Helps Xerox Achieve 100% Shipping Accuracy" from TI RFID News International Newsletter, Issue 20, 2000 (1 pg.).

Brochure from Intermec entitled "Intellitag® Questions & Answers" 1999 (8 pgs.).

Article from The Institution of Electrical Engineers entitled "Applications of RFID Technology" by Raza et al.; 1999 (5 pgs.).

Article entitled "Hot Technologies—Smart Tags for Tracking Parts and Products" from Fortune Jun. 26, 2000 (4 pgs.).

Article entitled "Money well spent" from Frontline Solutions Jun. 2000 (4 pgs.).

Article entitled "The Jury's Out in the case for RFID in logistics" from Frontline Solutions Jun. 2000 (9 pgs.).

Article from IDSystems website entitled "Welcome to the Intelligent Warehouse" including 2 sidebar articles; Sep. 1999 (21 pgs.).

Hornak, J.P.; "Auto ID . . . putting the control in inventory control"; Industrial Engineering; Norcross; Aug. 1994 (2 pgs.).

Finkenzeller; "RFID Handbook—Radio Frequency Identification Fundamentals and Applications"; 1999, pp. 227–273.

d'Hont, Susan; "Features—Smart pallet system improves warehouse productivity"; Sensor Review; vol. 16, No. 4, 1996 pp. 21–24.

Web article "MATRICS™ The Future of RFID Today—Applications" from website of www.natricsrfid.com; pp. 1–4; 2001.

Web article "Texas Instruments RFID—Logistics/Supply Chain Applications" from website of www.ti.com; 2 pgs. 2000.

d–Hont, Susan; "The Cutting Edge of RFID Technology and Applications for Manufacturing and Distribution"; from website www.isit.com; pp. 1–11; Jan. 31, 2002.

Booklet entitled "Distribution Center Management—Strategies & Tactics fro Distribution Center & Warehouse Excellence"; vol. 37, No. 3, Mar., 2002; Alexander Communication Group, Inc.; 8 pgs.

Article from Frontline Solutions Website entitled "Radio tags for supply chain logistics"; Colin Milner; from Automatic ID News Europe Jan./Feb. 1999 (10 pgs.).

Article entitled "Case Studies—Superdrug's Wireless Warehouse" from RF innovations Issue 1 May/Jun. 1998 (3 pgs.).

Article entitled "Case Studies—Healthcare Giant's Wound Management—Centre Gets Real–Time Wireless Treatment" from RF innovations Issue 8 Jun./Jul. 2000 (4 pgs.).

Article entitled "Stay on track" from Manufacturing Systems website; May 2000 (7 pgs.).

* cited by examiner

FIG. 5B  FIG. 5C

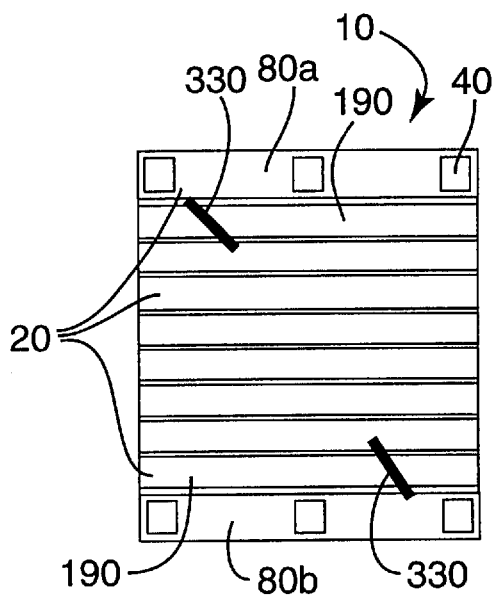
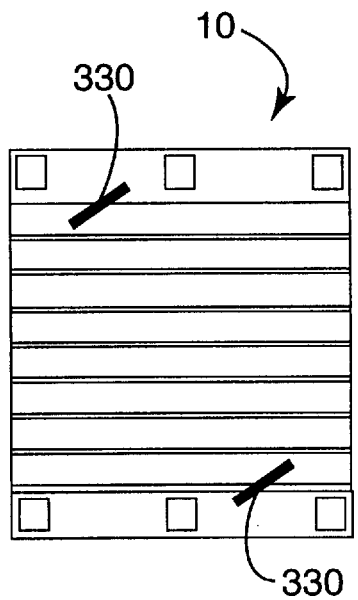
FIG. 6A      FIG. 6B
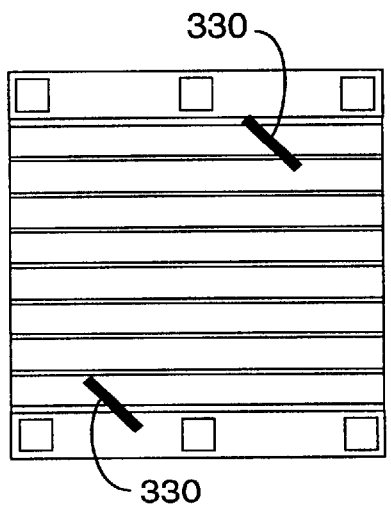
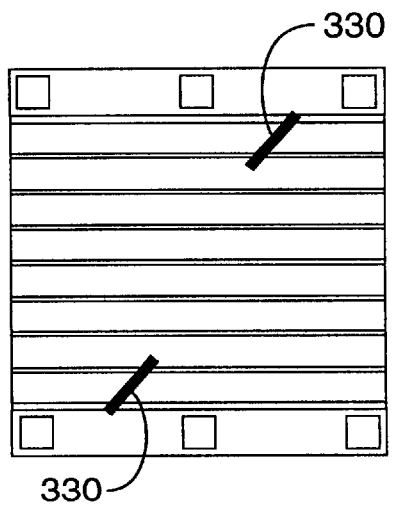
FIG. 6C      FIG. 6D

RADIO FREQUENCY IDENTIFICATION SYSTEMS FOR ASSET TRACKING

INCORPORATION BY REFERENCE

U.S. application Ser. No. 09/735,243, filed Dec. 12, 2000 and entitled "Object Tracking and Management System and Method Using Radio Frequency Identification Tags," PCT Publication No. WO 02/48955, is incorporated herein by reference.

TECHNICAL FIELD

The present invention relates to radio frequency identification (RFID) systems for asset tracking, and in one embodiment to such systems for use in tracking pallets.

BACKGROUND OF THE INVENTION

Pallets, containers, and other similar structures are used worldwide to aid in the transport of products of various kinds, and are preferred because they can be easily moved with the aid of a forklift truck, which may also be referred to as a forklift. The pallet can be loaded with products (which may be in containers or cartons, for example) at the end of a production process, moved to a storage or transport location, shipped, moved to another storage or transport location, and then moved to a location at which the products would be used or sold. Because the pallets can be lifted, moved, and stored easily, they make the transportation of products simple and fast.

Conventional pallets are square or rectangular and include reinforced areas beneath which the forks of a forklift can enter to lift the pallet. Some conventional pallets can receive the forks of a forklift from only two opposite sides of the pallet, and are referred to as "two-way" pallets. Other pallets can receive the forks of a forklift from any of its four sides, and are referred to as "four-way" pallets. An exemplary four-way pallet 10 is shown in FIG. 1 Typically pallets 10 are constructed of a wood such as fir or pine or man-made materials, and the individual pieces of the pallet are nailed, stapled, or otherwise fastened together. In other instances, a monolithic pallet can be provided, made for example from plastic. Assembled pallets can include horizontal wooden boards called deck boards 20. On the top of the pallet 10, the deck boards 20 are normally supported in the middle and along each edge by stringer boards 30. The stringer boards 30 may in turn be supported by blocks 40 provided at least at the four corners or vertices 50 of the pallet 10 and, perhaps, elsewhere along the outer edges 60 of the pallet or at its interior, or both. Other deck boards 20 (bottom deck boards) may be fastened to the underside of the blocks 40 to hold them in place, which can add rigidity and depending on the arrangement of those boards, can provide a top surface for the pallet if it is flipped over.

Assembled pallets normally include at least one board 20 at or near a side 60 of the pallet 10. Such a board is referred to as an "end board" 80. The deck boards may be made from wood, plastic, or one or more other known materials. There are normally two end boards 80 per pallet 10, but four could be provided on, for example, a four-way pallet. Because of their position, end boards 80 are frequently damaged by the leading ends of the forks of a forklift, and for that and other reasons, molded plastic end boards are sometimes preferred. Plastic boards 20 may also be more uniformly sized and may provide greater resistance to the negative effects of moisture, such as mold or rotting.

RFID tags are now well-known and typically include an integrated circuit (IC) that is operatively coupled to an antenna (the tag antenna). The tag may also have a battery, or it may have no battery and may instead obtain energy from an external reader. RFID tags without batteries may be preferred for applications in which lower cost is a dominant factor, and RFID tags with batteries may be preferred for applications in which a longer read range is preferred. Either or both may be used in conjunction with the present invention. The RFID tags of the present invention preferably resonate in the UHF or microwave frequency band, either of which enables an RFID reader to interrogate the tags from a sufficiently long read range to be useful.

The IC associated with an RFID tag typically includes a certain amount of memory in which a tag identifier is stored, and perhaps other information related to the tag, and/or the item or items with which the tag is to be associated. When an RFID reader (also known as an interrogator, either of which may read or write information to an RFID tag) transmits energy via its reader antenna to interrogate the RFID tag, the tag responds with information from which the reader can obtain the RFID tag identifier or other information. The data, identifier, or information obtained by the RFID reader may then be compared to entries in a database of identifiers or to information associated with that RFID tag. In that manner, information regarding an RFID-tagged item may be obtained, updated, and provided to a user, and/or written to an RFID tag, perhaps even in real-time.

Various patents and publications have described the use of RFID tags with pallets. For example, publication document Netherlands 9401836 describes a process and system for the identification of pallets, in which an RFID tag (transponder) is installed in the center of the pallet. Antennae elements are provided in the forks of a pallet moving apparatus, which is supposed to enable a device to obtain information from the RFID tag. U.S. Pat. Nos. 5,662,048 and 5,971,592 also relate to a pallet having a data storage device from which a data collection device can obtain information. These and other sources do not, however, aid in the resolution of a number of practical difficulties that are resolved by the methods, systems, and devices of the present invention.

SUMMARY OF THE INVENTION

One aspect of the present invention provides an asset tracking system. One embodiment of the asset tracking system comprises: a) at least one RFID reader antenna positioned on a fixed portion of a forklift; b) at least one RFID reader antenna positioned on a portion of the forklift that is vertically movable with respect to the fixed portion; and c) a pallet including at least two RFID tags, in which one RFID tag is positioned in one quadrant of the pallet and another RFID tag is positioned in an opposite quadrant of the pallet, to enable at least one of the RFID tags to be interrogated by an RFID reader antenna adjacent any one of the four sides of the pallet.

Another aspect of the present invention provides a pallet. One embodiment of the pallet comprises: (a) a first REID tag provided in a first quadrant of the pallet; and (b) a second RFID tag provided in an opposed second quadrant of the pallet, such that an RFID reader antenna that approaches the pallet from one of the four sides of the pallet can interrogate at least one of the RFID tags.

Another aspect of the present invention provides a forklift RFID system. One embodiment of the forklift RFID system comprises: a) at least one RFID antenna positioned on a fixed portion of the forklift; and b) at least one RFID antenna positioned on a portion of the forklift that is vertically movable with respect to the fixed portion.

Another aspect of the present invention provides a forklift RFID system. One embodiment of the forklift RFID system comprises: (a) a forklift having a mast and a load backrest; and (b) at least one RFID antenna positioned within a column on each side of the forklift, the columns each being bounded by (i) the outer edge of the forklift mast; (ii) the outer edge of the forklift, (iii) the hack edge of the forklift mast, and (iv) the front edge of the load backrest.

Another aspect of the present invention provides a board for a pallet. One embodiment of the board for a pallet comprises a board for a pallet, wherein the board includes an edge and an RFID tag positioned at approximately a 45-degree angle with respect to that edge.

Another aspect of the present invention provides a pallet including a corner block. One embodiment of the pallet including a corner block comprises a pallet including a corner block, wherein the corner block includes a chamfered inside corner with an RFID tag affixed thereto.

BRIEF DESCRIPTION OF THE DRAWINGS

The present invention will be described with reference to the appended Figures, in which

FIGS. 5A, 5B, 5C, and 5D are top views of a forklift engaging a pallet from one of four opposed directions according to the present invention;

FIGS. 6A, 6B, 6C, 6D, 6E, 6F, 6G, 6H, 6I, 6J, and 6K are top views of pallets with RFID tags located in various positions and orientations according to the present invention;

DETAILED DESCRIPTION OF THE INVENTION

A. RFID Tagged Pallets

Figure 1:
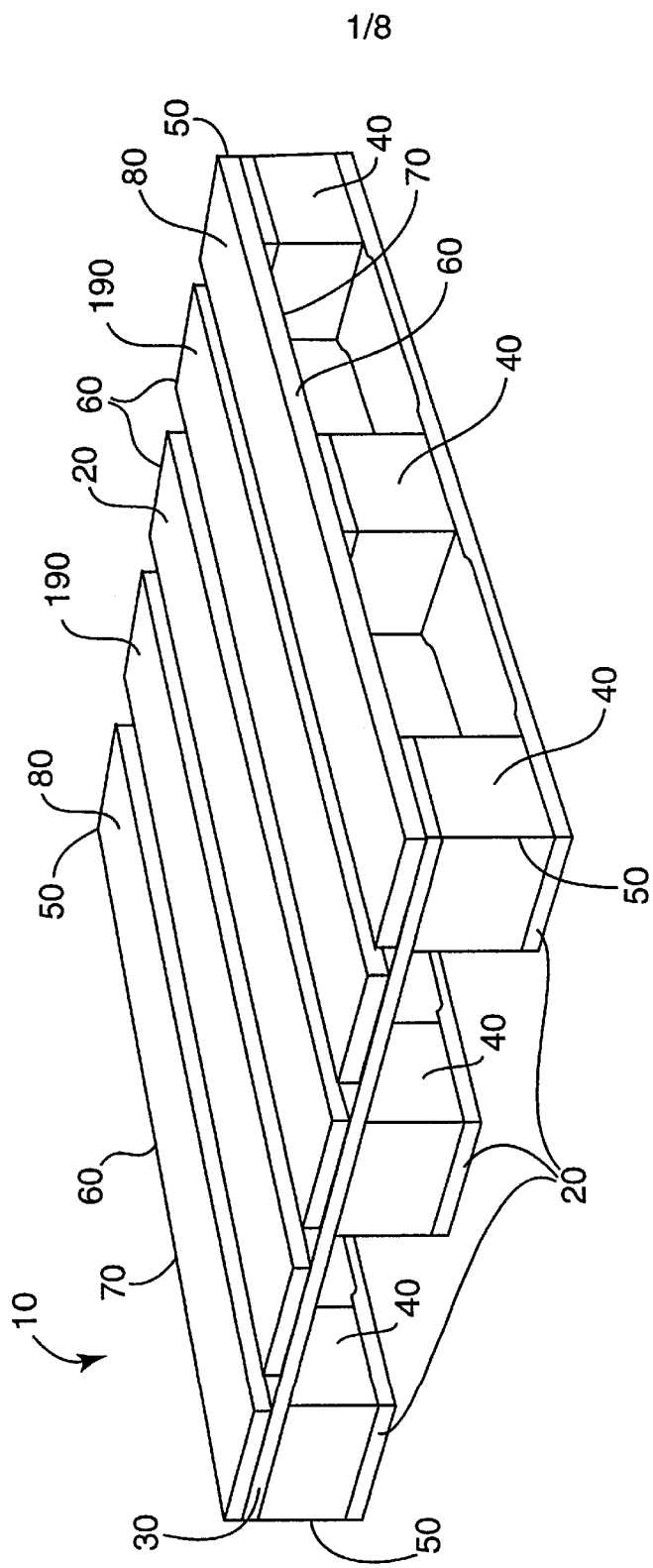
FIG. 1 illustrates a perspective view of a prior art pallet.

Many companies own pallets, and some owners of pallets lease them to other companies for their use. Following the use of a pallet to transport goods to a destination, the pallets might be returned to the pallet owner, another entity, or to a specific location for examination, reuse, reconditioning, repair, or disposal. If the pallet has an RFID tag, and up-to-date information including information concerning the pallet is written to the tag, then the tag can contain information about the current status and the history of the pallet or its contents or both. Thus, tagging the pallet can help record the location of the pallet, the condition of the pallet, the contents of the pallet, the time the pallet spends at any particular pallet handler, the destination and routing schedule, and history of the pallet including pallet repairs, and other information of interest to the user or owner, or both. This and other information can be obtained quickly and easily from each pallet by simply using an RFID reader to interrogate the RFID tag associated with the pallet. A convenient method of reading information from such a tag is to attach an RFID reader to a forklift truck, so that the RFID tag associated with one or more pallets may be interrogated, and the location of a particular pallet can be tracked within a warehouse, distribution center, or other facility. The present invention includes within its scope a number of related improvements to that type of system and method that are believed to overcome certain challenges faced in attempting to implement such a system.

The present invention includes the particular placement of an RFID tag in or on a deck board 20 and certain other locations on a pallet 10. Before describing key aspects of that placement and othe rparts of the invention, a brief description of suitable RFID tags will be provided.

B. RFID Tags and Readers

A number of RFID readers and tags may be useful with the present invention, including one currently available from the Single Chip Systems Corporation (SCS) of San Diego, Calif., under the designation U519 INSTASCAN Scanner. One type of RFID tag useful with that and other RFID readers is also currently available from SCS under the designation "DUAR-LABEL," and specifically under the designations DL-100, DL-400, DL-1000, and DL-9000.

C. Preferred Orientation and Position of RFID Tags with Respect to Reader Antennae In the following descriptions of RFID tags, tag antennae, reader antennae, pallets and pallet boards, the longest dimension of the object is referred to as the length and is measured along a central longitudinal axis. The shortest dimension of the object is referred to as the thickness and is measured along a central z axis. The other dimension is referred to as the width, and is measured along a central transverse axis. The transverse axis of the object and the longitudinal axis of the object together define a plane. For example, in the case of an RFID tag, the plane defined by the longitudinal axis and the transverse axis is referred to as an RFID-tag plane. In the case of a reader antenna, the plane defined by the longitudinal and transverse axes of the reader antenna is referred to as the plane of the reader antenna.

There are several factors that are believed to be correlated to the ability of an RFID reader to successfully interrogate an RFID tag, and particularly the ability of an RFID reader associated with a forklift to successfully interrogate an RFID tag associated with a pallet or the like. Those factors include the angle of the tag antenna plane with respect to the reader antenna plane (which is preferably minimized); the degree to which the tag antenna is "on axis" with respect to the plane of the reader antenna; and the distance between the tag antenna and the reader antenna. For cases in which linearly polarized antennas are used, an additional factor is the extent to which the longitudinal axis of the tag is aligned relative to the polarization axis of the reader antenna. Performance is believed to be optimized when the longitudinal axis of the tag is parallel to the polarization axis of the antenna.

Accordingly, the present invention provides a pallet having RFID tag(s) in locations that have not previously been recognized as advantageous, and as a result the information stored on the RFID tags is more easily and reliably obtained when the RFID reader interrogates the RFID tag(s). More specifically, a four-way pallet is described herein in which the associated RFID tags may be easily and reliably read when the pallet is approached by a forklift from any one of the four directions, but requires only two tags on each pallet to do so. This feature is particularly useful when multiple loaded pallets, or stacks of pallets, or stacks of other tagged items, are being transported by the forklift simultaneously.

Figure 2:
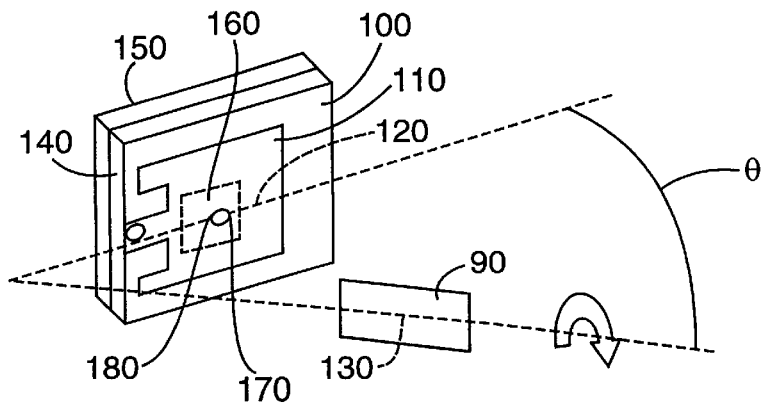
FIGS. 2, 3, and 4 illustrate spacial relationships between an RFID reader antenna and an RFID tag according to the present invention.

FIG. 2 shows, schematically, an example of the orientation and position of a tag antenna 90 with respect to the plane 100 of an exemplary reader antenna 110. The tag antenna 90 is shown schematically in outline as a two dimensional planar rectangle. Actual RFID tags of course have a thickness and may have a different shape than the idealized one shown. The axis 130 of the tag antenna is also shown in FIG. 2. Although the various axes of the RFID tag are normally coincident with or at least parallel to the corresponding axes of the tag antenna (for example, the longitudinal axis of the RFID tag is normally coincident with or parallel to the longitudinal axis of the tag antenna), and will be described as such, that may not always be the case. The variations are within the scope of the present invention as well. The angle between the plane of the reader antenna 110 and the longitudinal axis 130 of the tag antenna 90 is shown generically as the angle $\theta$ in FIG. 2. The reader antenna 110 in FIG. 2 typically, but not necessarily, comprises a dielectric layer 140 and a ground plane 150. The reader antenna 110 is exemplified, schematically, in FIG. 2 as approximately planar and is linear polarized having a longitudinal axis 120. However, the reader antenna 110 of the invention need not necessarily be linear polarized. It could, for example, be circular-polarized.

Figure 3:
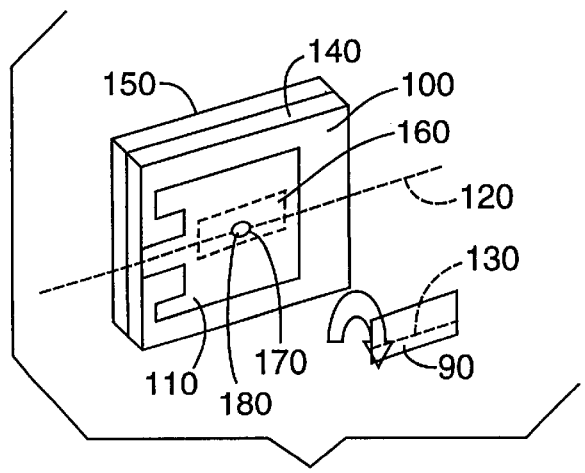

In FIG. 3, the longitudinal axis 130 of the tag antenna 90 is parallel with the plane 100 of the reader antenna 110. In FIG. 3, the angle $\theta$ is zero degrees, meaning that the plane 100 of the reader antenna 110 and the axis 130 of the tag antenna 90 are parallel. In both FIGS. 2 and 3, the tag antenna 90 is said to be "on axis" relative to the reader antenna 110, because the projection 160 of the tag antenna 90 in the direction of the z-axis of the reader antenna 110 onto the plane 100 is within the boundaries of the antenna 110.

Figure 4:
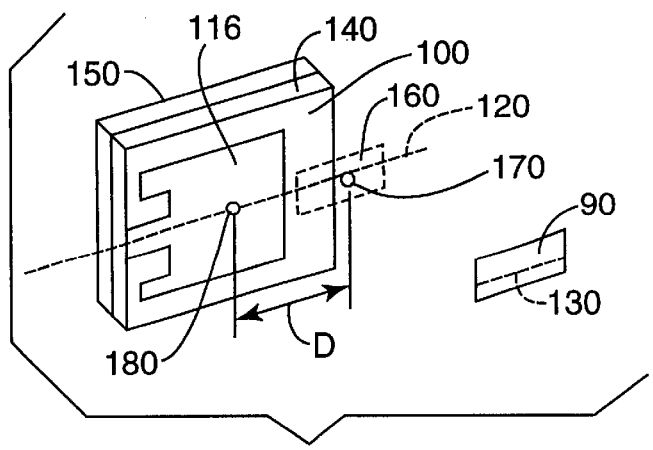

In FIG. 4, the tag antenna 90 is shown "off axis" to the reader antenna 100. The center 170 of the projection 160 and the center 180 of the reader antenna 110 are at an offset distance "D" from one another. The relative positions of the tag antenna and the reader antenna, when the former is projected onto the latter, may be summarized as follows: off axis (when the entire projection of the tag antenna falls outside the reader antenna), partially on-axis (when a portion of the projection of the tag antenna falls inside the reader antenna, but the center of the projection is outside of the reader antenna), substantially on-axis (when the center of the projection of the tag antenna falls inside the reader antenna), and on-axis (when the center of the projection of the tag antenna is aligned with the center of the reader antenna). These relative positions of the reader antenna and the tag antenna are in increasing order of preference, with on-axis tag positioning being the most preferred though not required. Although it is unlikely that a tag antenna will always be exactly on-axis relative to the reader antenna, better interrogation performance is believed to be obtained when angle $\theta$ is zero degrees and the tag is at least substantially on-axis, meaning that the center of the projected tag antenna falls somewhere within the boundaries of the reader antenna 110. For on-axis interrogation, interrogation performance is acceptable at $\theta$ of about 30 degrees or even about 45 degrees, but after angle $\theta$ increases to more than about 55 or 60 degrees, it is very difficult to successfully interrogate the tag. Acceptable interrogation performance may be obtained for off-axis tag positions if angle $\theta$ is greater than zero degrees; the preferred angle depending on factors including the distance between the tag and the antenna and the distance D.

In one embodiment of the invention, a preferred position of the tag (and therefore tag antenna) on the pallet is provided that results in decreased offset distances, D, when a forklift with the antenna arrays of the invention engages a pallet. In another embodiment, certain tag orientations on the pallet are described, which facilitate the interrogation of those tags regardless of the direction from which a pallet (such as a four-way pallet) is approached by a forklift. These and other aspects of the invention are described in greater detail below.

Figure 5A:
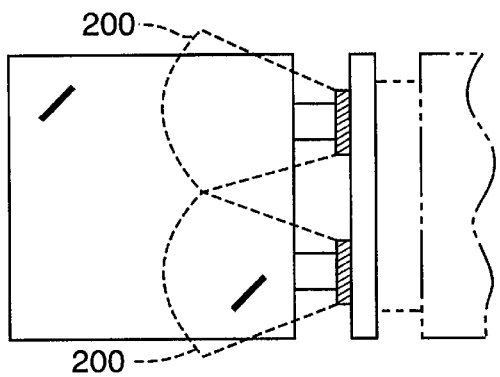
Figure 5D:
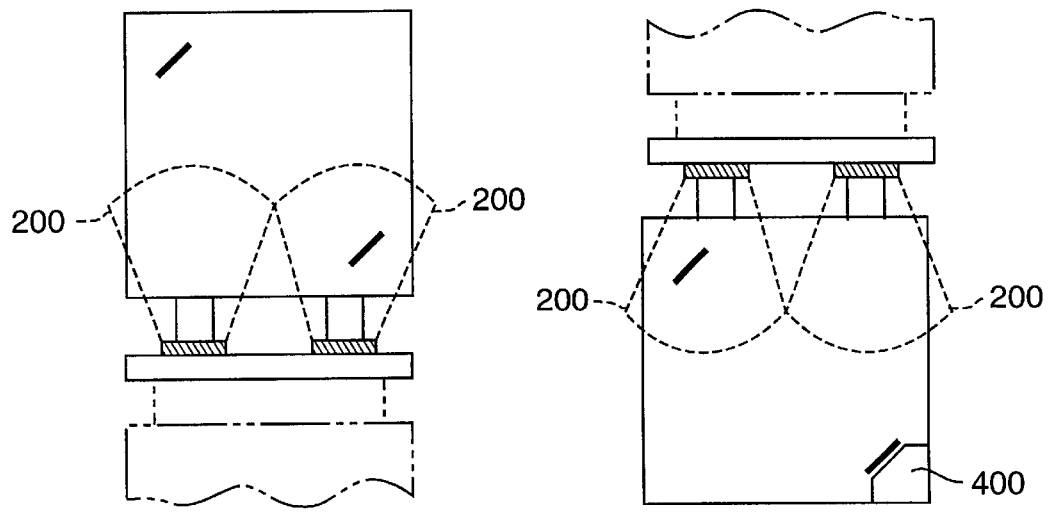

FIG. 5A is a top view of a rectangular four-way pallet 10, with one of the four possible positions in which a forklift can engage with the pallet 10. FIGS. 5B, 5C, and 5D show the other three possible forklift positions, and will be described in turn below. In each position, the forklift truck is centered with respect to the side 60 of pallet 10 facing the front of the forklift. Each antenna interrogates RFID tags within the range of the antenna by transmitting a signal in a generally conical pattern 200, as shown. Accordingly, when a forklift approaches a pallet as shown in FIG. 5A, at least one of the antennas interrogates the RFID tag positioned in the adjacent portion of the pallet. Moreover, if the RFID tag is positioned generally as shown, at approximately a 45-degree angle with respect to the side 60 of the pallet, then the RFID tag will preferably be on-axis, or perhaps substantially on-axis, or at least partially on-axis relative to the RFID reader antenna. A particularly beneficial aspect of the present invention is then apparent from FIGS. 5B, 5C, and 5D. In each case, the position of the RFID tag, at approximately a 45-degree angle, enables the forklift antennas to interrogate the RFID tag on-axis, or perhaps substantially on-axis, or at least partially on-axis. More specifically, in FIG. 5B the right-hand reader antenna can interrogate the RFID tag in the lower right-hand quadrant of the pallet; in FIG. 5C the left-hand reader antenna can interrogate the RFID tag in the upper left-hand quadrant of the pallet; and in FIG. 5D the right-hand reader antenna can interrogate the RFID tag in the upper left-hand quadrant of the pallet. Another manner of describing the location of the RFID tags in or on the pallet is that they are generally provided in opposed (rather than in adjacent) quadrants of the pallet, as shown. This general arrangement of the forklift and pallet can be done with only two RFID antennas on the forklift and two RFID tags (positioned generally as shown, or as later described and shown), if desired, or with more antennas and/or tags as desired. The 45-degree angle referenced and shown in the Figures is preferred, but other angles may be used if the RFID reader antenna is still able to interrogate the RFID tag successfully.

Figure 5D:
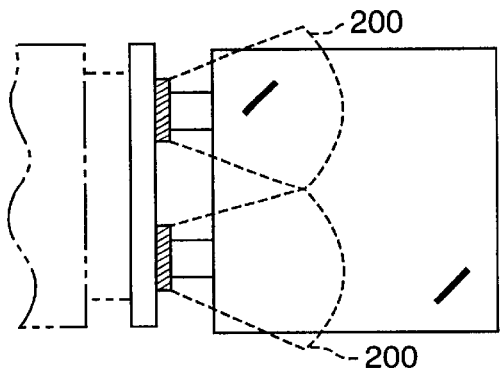
Figure 6E:
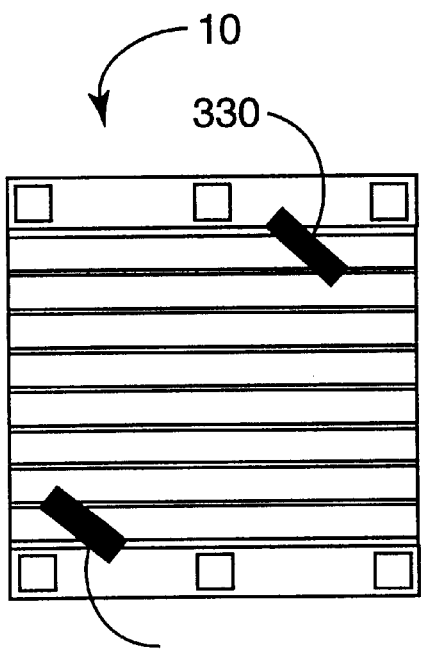
Figure 6F:
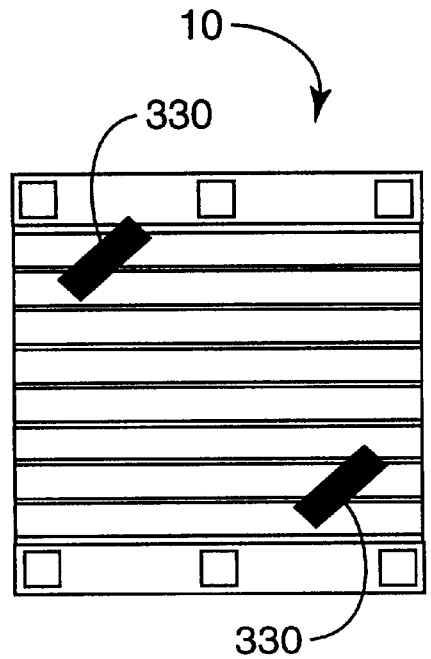
Figure 6G:
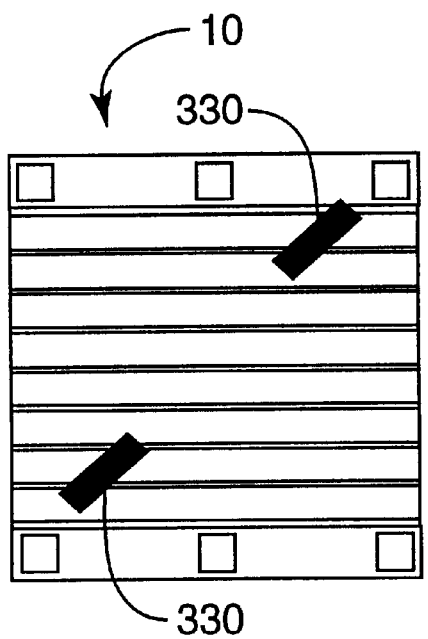
Figure 6H:
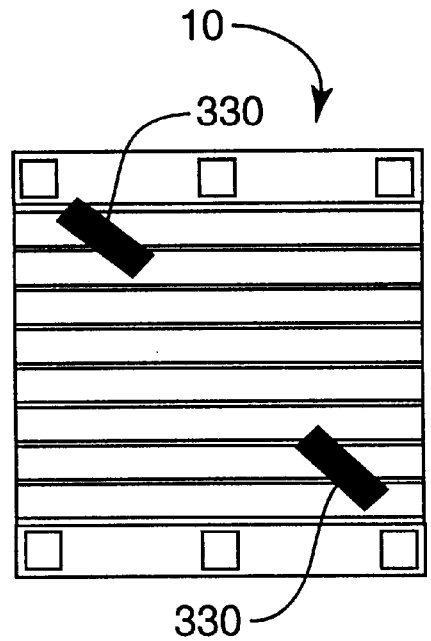
Figure 6I:
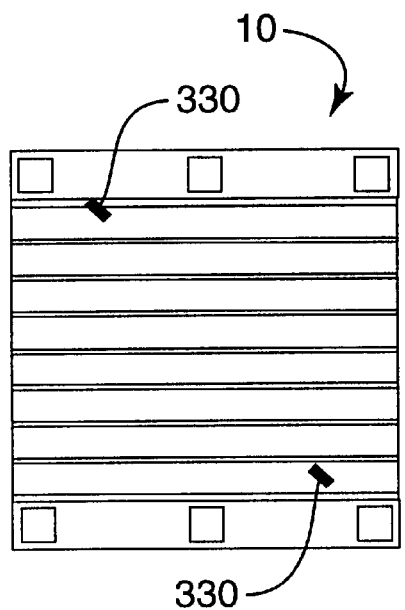
Figure 6J:
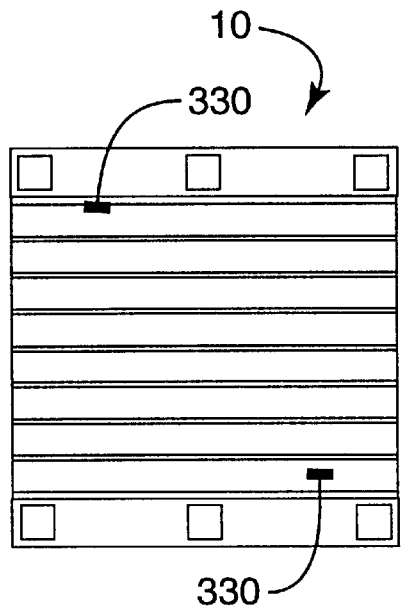
Figure 6K:
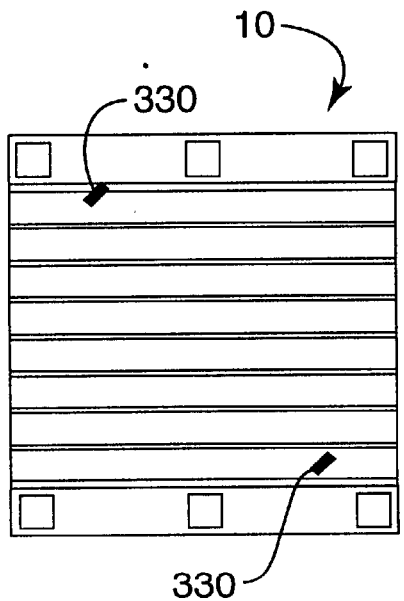

The particular arrangement of RFID tags on the pallet shown in FIG. 5 is useful, but not the only arrangement that is within the scope of the present invention. FIGS. 6A through 6K illustrate embodiments that may also be useful for applications including the one shown in FIG. 5. FIGS. 6A, 6B, 6C, and 6D show embodiments in which the transverse axis of the RFID tag is generally parallel to the z-axis of the pallet, FIGS. 6E, 6F, 6G, and 6H show embodiments in which the transverse axis of the RFID tag is generally parallel to the plane of the pallet, and FIGS. 6I, 6J, and 6K show embodiments in which the longitudinal axis of the RFID tag is generally parallel to the z-axis of the pallet. In each of these cases, the polarization axis for each antenna in the array should be favorably aligned relative to the longitudinal axes of the tags in the pallets to maximize the read performance.

Antenna arrangements of the general type described above may be useful in interrogating the RFID tags associated with a single pallet. That is, the two antennas illustrated in FIG. 5 (or such other number of antennas as are chosen) can be adapted to successfully interrogate one or more RFID tags provided on a pallet in the manner described above, whether that pallet is empty or loaded. However, in many applications, a forklift carries more than one pallet, and accordingly the present invention includes embodiments in which RFID reader antennas are provided in an array to enable the system to successfully interrogate multiple pallets. Those pallets could be a stack of empty pallets (20 stacked empty pallets, for example), or side-by-side stacks of empty pallets (two stacks of 20 empty pallets, for example). The latter, which may be referred to a double-stack of pallets, may require a second set of forks on the forklift, and accordingly a second array of RFID reader antennas. In another example, multiple loaded pallets are stacked atop each other for simultaneous movement by a forklift, as in the case of pallets of building materials such as wood, drywall, or concrete products, and other stacked arrangements such as cartons where the top surface is relatively level, strong, and stable. Again, an antenna array would be useful to enable the RFID forklift system to interrogate all those pallets, preferably substantially simultaneously.

Figure 7:
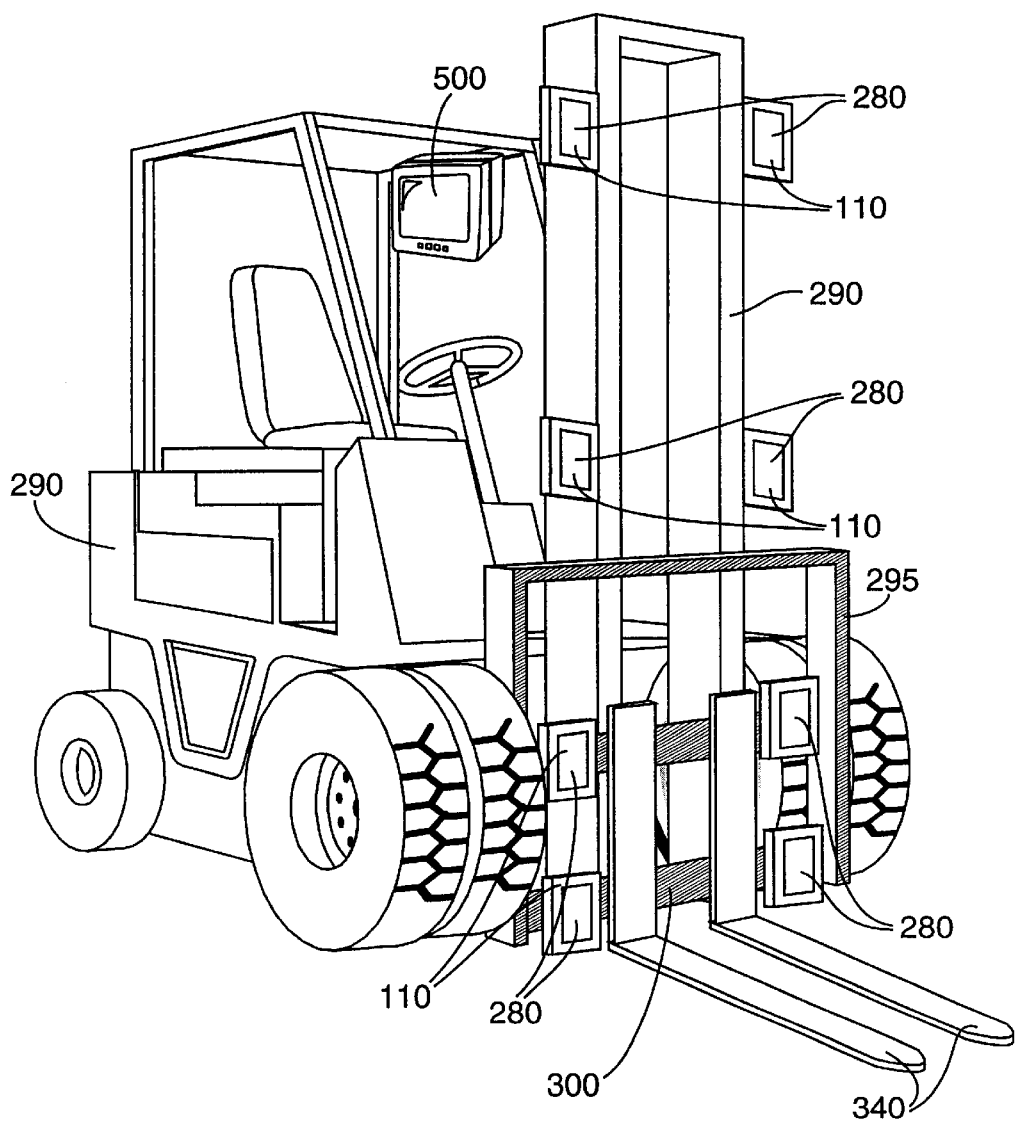
FIG. 7 is a front perspective view of a forklift provided with a set of reader antennas according to the present invention.

To address these and other situations, the reader antennas shown in FIG. 5 may be arranged in an antenna array, one example of which is shown in FIG. 7. In that illustration, two lower RFID reader antennas are provided, two middle RFID reader antennas are provided above the lower antennas, two upper RFID reader antennas are provided above the middle antennas, and two top RFID reader antennas are provided above the upper antennas. These antennas are preferably, but not necessarily, vertically aligned, and thus are spaced an approximately uniform distance apart. In one embodiment described in further detail below, at least one antenna is provided on a vertically movable portion of the forklift and at least one antenna is provided on a relatively fixed portion of the forklift. In cases such as that, it may be difficult or impossible to provide the antennas in vertical alignment. In those and other cases, some of none of the antennas may be vertically-aligned, so that, for example, in an embodiment such as in FIG. 7, the upper and top antennas are vertically aligned, but both are farther from the centerline of the forklift than the middle and lower antennas, which are also vertically aligned with each other on each side of the forklift. Pairs of reader antennas may be provided in general horizontal alignment also, if desired, as illustrated in FIG. 7.

When the antenna array(s) 280 are provided as shown in FIG. 7, for example, then as a load of multiple pallets is lifted vertically, more than one antenna may interrogate each RFID-tagged pallet. Any duplication in interrogation can be handled by software programs that are known in the art. Although in the illustrated embodiments of the invention the RFID reader antennas have planes that are perpendicular to the centerline of the forklift, the reader antennas can be angled if desired to produce a beneficial effect. For example, antennas provided on the fixed portions of the forklift could be angled toward the centerline of the forklift, and those provided on the movable portions could be angled away from the centerline, or the reverse, or any useful combination of angled and perpendicular antennas.

Another manner of describing an array of RFID antennas of the type illustrated in FIG. 7 is as follows. The preferred mounting zones for RFID antennas may be within two columns that are preferably symmetrical with respect to the centerline of the forklift. The boundaries of these columns preferably extend laterally, on each side, from the outer edge of the forklift mast 290 to the outer edge of the forklift itself, and from the back edge of the forklift mast 290 to the front edge of the load backrest. RFID antennas can be placed in these columns wherever needed to obtain adequate interrogation performance, which may depend on whether the pallets that are normally transported are empty or loaded (and if loaded, with what). It is also preferred that any antenna that is located above the top of the load backrest 295 be mounted on the forklift mast 290 as a stationery antenna, and that any antenna mounted below the top of the load backrest 295 be mounted on the movable portion of the forklift. Enhanced RFID interrogation performance is believed to be available when the RFID antennas are arranged in this columnar arrangement or, if one column of antennas cannot be provided on each side of the forklift centerline, then with as many of the RFID antennas vertically aligned in the expected position of the RFID tags on the pallets as possible.

D. Mounting an RFID Tag on a Pallet

Figure 8:
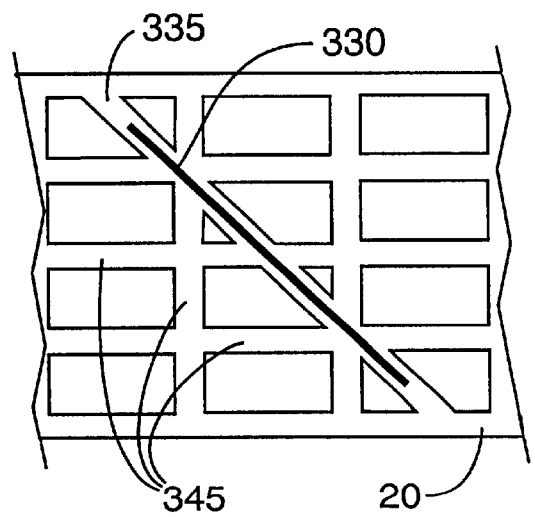
FIG. 8 is a bottom view of an RFID tag provided in a slot formed in a board having stiffening ribs according to the present invention.

The RFID tag may be mounted in or on a pallet in several different ways. For example, it may be useful to affix the RFID tag 330 to a board 20 of the pallet, so that the relative position of the tag and the board is fixed at, for example, a 45-degree angle. The RFID tag may be provided on the lead or end board, or any other suitable board or the equivalent. A conventional pallet 10 can easily be modified by the replacement of one or more boards 20 with a board made of plastic or wood having an attached RFID tag 330. In another embodiment, the tag 330 is secured to a plastic board 20 as shown in FIG. 8 wherein an insertion slot 335 for a tag is supplied between stiffening ribs 345 on the underside of the plastic board.

Preferably, the RFID tag 330 is spaced away from any connection zones, which are parts of the pallet 10 where the components of the pallets are secured together with nails, screws, staples, or other metal fasteners. The RFID tag 330 is also preferably spaced away from any surface such that moisture does not collect between the tag and the surface, which could lead to corrosion, bacteria or mold affecting the tag. Thus, the RFID tag 330 may need to be spaced away from the connection zone or other surfaces by a distance that depends on the characteristics of the tag and the materials near the tag.

Figure 9:
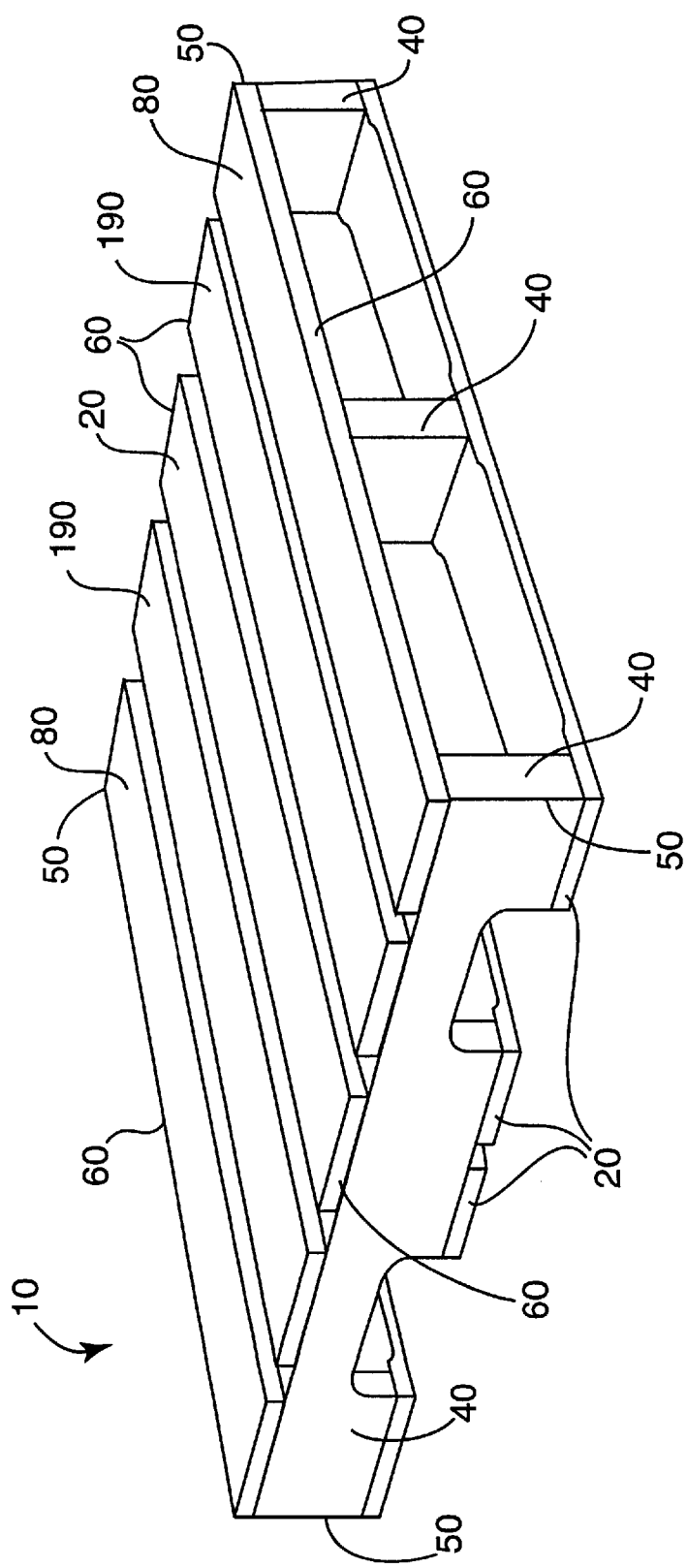
FIG. 9 is a perspective view of an alternative pallet according to the present invention.

Pallets 10 can be of the stringer type or a block type (an example of a block pallet is shown in FIG. 1). FIG. 9 shows an example of a four-way stringer pallet 10. Both are typically rectangular, and an overall loadable area of 102 cm×122 cm (40×48) inches is common. Stringer pallets can be two or four way. Tags 330 can advantageously be mounted on the lead boards, or on the second boards 190, of either type of pallet.

A particularly advantageous location for the RFID tags of the present invention is on an inside surface, and preferably on a chamfered inside corner, of a block, as shown for example in FIG. 5C at 400. Different tag orientations, such as those shown in FIGS. 6A through 6K, may be used in that same location. One embodiment is to include an RFID tag having its longitudinal axis (and thus the longitudinal axis of the tag antenna) parallel to the z axis of the pallet, and affixed to the chamfered inside corner of blocks associated with two opposed quadrants of the pallet.

E. Other Embodiments of the Present Invention

An additional aspect of the present invention relates to providing antennas on forklifts in a particular manner. As shown in FIG. 7, a reader antenna array 280 comprises at least one reader antenna 110 on a fixed portion such as the mast 290 of a forklift and at least one reader antenna on a vertically movable portion 300 of the forklift. The fixed portion of the forklift may include the hydraulics required to lift the movable portion, or may be a part of the frame or the cage of the forklift, or another such structure. The vertically movable portion of the forklift raises the pallets and their contents, if any, to a desired elevation, either simply to enable the forklift to move with the pallet, or to lift the pallet up to an elevated storage location. The vertically movable portion of the forklift may also be horizontally or laterally movable, or extensible away from the forklift, or both, as is known in the art.

In the embodiment of the invention shown in FIG. 7, a forklift is equipped with one or more RFID readers and two or more RFID antennae 110 operatively connected to the one or more RFID readers. One antenna is located on a portion of the forklift that remains in a fixed position, such as mast 290, and the second antenna is located on a portion of the forklift that is movable 300, as described below. As shown in FIG. 7, the movable portion 300 that includes at least two forks 340, a back frame 295 to which the forks are connected, and a mechanical or hydraulic lift system associated with mast 290 that lifts the frame and thereby the forks, to elevate the load. The lift system may also be able to shift the frame and forks from side-to-side, and the forks themselves are typically laterally adjustable to enable them to fit under or within pallets of different dimensions. The frame and forks are movable, and in the aspect of the invention described in this section include at least one RFID antenna for reading RFID tags associated with pallets, or one or more items carried on the pallets, or both. The lift system is in a fixed position relative to the remainder of the forklift, and although portions of the lift system must move to elevate the forks and frame, it is considered for purposes of the present invention to be in a fixed position.

One particular advantage of an antenna arrangement of this type, and particularly an arrangement where the antenna (e) that are provided on the fixed portion of the forklift are positioned above the frame and forks when the latter are in their lowered position, is that essentially all of a stack of empty RFID-tagged pallets can be interrogated almost simultaneously by at least one antenna in the antenna array. Accordingly, one aspect of this invention is the combination of an forklift equipped with an RFID reader and at least one RFID antenna on each of the fixed and movable portions of the forklift, and at least one stack of pallets that are each equipped with an RFID tag.

The positioning of the antennae shown in FIG. 7 provides several advantages. First, antennae are positioned so as not to obscure the forward view of the forklift operator so that operating ability of the driver is not impaired. Second, the antennae are contained within the outer periphery of the forklift. This is to limit the danger of the antennae snagging or contacting objects as the forklift is in motion.

A number of variations on this aspect of the invention are possible. First, the forklift may have more than one RFID reader, and even one RFID reader associated with each RFID antenna. Second, the RFID reader may also be capable of programming or writing information to the RFID tags, and may do so using the same RFID antennae as the readers use to obtain information from the RFID tags. Third, the RFID readers can have an integral data storage device, a removable data storage device (such as a flash memory card or another removable medium), or can be connected to an external database and computer by a wired or wireless link. Fourth, the forklift may include more than the standard two forks, and in one embodiment include four forks appropriately spaced to enable the forklift to carry two vertical stacks of pallets, each stack including one or more pallets. The pallets could be fill, partially loaded or empty. Forklift trucks can be equipped with very high masts enabling the positioning of a pallet 10 in a very high location. Such a forklift truck is normally called a reach truck. If the forklift system is required to read tags 330 on pallets 10 wherein there are less than four tags per pallet for the pallet-tag configurations shown in FIG. 6, then antenna arrays of one or more antennae on both sides of the forklift as shown in FIG. 7 are preferred. This is also preferred for four-way pallets having no more than two tags per pallet. This is because, in that way, there is always an antenna array adjacent or near to a pallet RFID tag. This gives improved readability of the tag. For forklifts with two pairs of front-mounted forks, the configuration of antennae shown in FIG. 7 is one example of a configuration of antennae mounted on the forklift. Other arrangements are also within the scope of the present invention.

The cables or other connection devices used to connect the various components of the present invention (including the RFID reader, the RFID antennae, a power source, a touch-panel display or other user interface) should be sufficiently durable and protected to avoid damage in the conditions to which the forklift is expected to be exposed. Forklifts are notorious for inflicting and sustaining damage, and the components and connections should, to the extent possible, be covered or otherwise protected. To the extent that cables connect components on the fixed portion of the forklift to ones on the movable part, those cables can be festooned through pulleys or other suitable structures to maintain their position and appropriate tension. Alternatively, wireless communications systems can be provided between the reader antennas, the reader, and host computer, if desired. To minimize the power required to operate the reader, it may be desirable to multiplex interrogation signals among the RFID reader antennas, rather than broadcast constant interrogation signals through all antennas. These types of signal multiplexing arrangements are known in the art.

In another embodiment, the forklift may include one or more RFID reader antennas adapted to interrogate location RFID tags located within a building or other location. Those location tags can provide information to the RFID interrogation system regarding the location where a pallet was found, where it was taken (such as through which dock gate door, or other portal), and where it was left. The reader antenna used to read location RFID tags could be located atop the forklift, and the RFID tags located at or above the level of that antenna, for example. That antenna could also be in the multiplexing sequence with the other antennas described herein.

In one embodiment of the invention, a forklift is provided with a sensor such as a proximity sensor that activates the RFID interrogation system when the front of the forklift comes within a predetermined distance of an object. In that manner, the RFID interrogation system does not need to be permanently activated, but can instead become activated when a pallet or stack of pallets is approached by the forklift. Optical proximity sensors are one suitable type of sensor for these purposes, but others may be envisioned. The forklift RFID system may also or instead be adapted to turn off if an RFID tag has not been successfully interrogated within a predetermined period of time, again so that the RFID interrogation system does not have to be permanently activated. For example, if the RFID interrogation system has not successfully interrogated an RFID tag (which may be a pallet tag, a location tag, or another tag) for 10 minutes, the RFID interrogation could enter "sleep" mode, and await a signal instructing it to activate again.

The system of the present invention preferably also includes a user interface, such as a display 500 (which may be a touch-panel display) visible to an operator of the forklift, a keyboard, a removable data storage device (such as a floppy disc drive, or flash memory card). The user interface preferably is adapted to display information to the user regarding the pallets interrogated by the RFID reader antennas, the contents of the pallets (which information may be available from the RFID tags, a database, or a combination of the two), how many RFID tags were successfully interrogated, which location tag(s) are the closest, the desired location for the pallet, an indication of whether the forklift is approaching a correct or an incorrect location tag (based on the pallet(s) carried by the forklift and their intended location(s)), and other information of the type described earlier. The user interface enables the operator to input additional data (for example through the touch-panel display or keyboard), such as the condition of the pallet or its contents, the time that it was picked up or dropped off, the operator's identity, or other such information. The touch-screen display may also include a calibration system, so that no keyboard is required when a screen is repaired or replaced.

The advantages of the present invention are numerous and substantial. Among them are the ability to successfully interrogate multiple pallets (either loaded or unloaded), and the ability to approach and interrogate multiple pallets or multiple pallet loads from any one of four directions while minimizing the number of tags necessary for each pallet. Although the present invention has been described primarily with reference to pallets, persons of skill in the art will understand that these teachings can also be applied to containers, bins, racks, totes, or other storage devices.

We claim:

1. A forklift RFID system, comprising:
   a) at least one RFID antenna positioned on a fixed portion of the forklift;
   b) at least one RFID antenna positioned on a portion of the forklift that is vertically movable with respect to the fixed portion;
   c) a user interface including a touch-panel display; and
   d) software adapted to provide information to the display describing which RFID tags have been interrogated by the antennas.

2. The forklift RFID system of claim 1, wherein the system comprises at least four spaced antennas on the fixed portion of the forklift, and at least four spaced antennas on the vertically movable portion of the forklift.

3. The forklift RFID system of claim 1, wherein the forklift further comprises an antenna for interrogating RFID location tags in a storage area.

4. The forklift RFID system of claim 3, wherein the antenna for interrogating RFID location tags in a storage area is located on the top of the forklift, and at least one RFID location tag is located in the storage area above that antenna.

5. The forklift RFID system of claim 1, wherein the system further comprises a multiplexing circuit for multiplexing interrogation signals among the at least two antennas.

6. The system of claim 1, wherein the system further comprises software adapted to provide information to a user interface regarding a pallet.

7. The system of claim 1, wherein the software associates an RFID-tagged pallet with an RFID location tag.

8. The system of claim 1, wherein the software provides a signal to a user through the user interface when a forklift carrying an RFID-tagged pallet approaches a correct RFID location tag.

9. The system of claim 1, wherein the software provides a signal to a user through the user interface when a forklift carrying an RFID-tagged pallet approaches an incorrect RFID location tag.

10. The system of claim 1, wherein the forklift includes at least one sensor to activate an RFID interrogation system automatically.

11. The system of claim 1, wherein the forklift includes a deactivation system to turn off the RFID interrogation system automatically if no RFID tag has been successfully interrogated for a predetermined period of time.

12. A forklift RFID system, comprising:
    a) a forklift having a mast and a load backrest;
    b) at least one RFID antenna positioned within a column on each side of the forklift, the columns each being bounded by (i) the outer edge of the forklift mast; (ii) the outer edge of the forklift, (iii) the back edge of the forklift mast, and (iv) the front edge of the load backrest;
    c) a user interface including a touch-panel display; and
    d) software adapted to provide information to the display describing which RFID tags have been interrogated by the antennas.

13. The forklift system of claim 12, wherein the system includes at least four RFID antennas, two of which are disposed on each side of the mast.

14. The forklift RFID system of claim 12, wherein the system includes at least eight RFID antennas, four of which are disposed on each side of the mast.

15. The forklift RFID system of claim 12, wherein the system comprises at least one antenna on a fixed portion of the forklift, and at least one antenna on a vertically movable portion of the forklift.

16. The forklift RFID system of claim 12, wherein the forklift further comprises an antenna for interrogating RFID location tags in a storage area.

17. The forklift RFID system of claim 16, wherein the antenna for interrogating RFID location tags in a storage area is located on the top of the forklift, and at least one RFID location tag is located in the storage area above that antenna.

18. The forklift RFID system of claim 12, wherein the system further comprises a multiplexing circuit for multiplexing interrogation signals among the at least two antennas.

19. The system of claim 12, wherein the system further comprises software adapted to provide information to a user interface regarding a pallet.

20. The system of claim 19, wherein the software associates an RFID-tagged pallet with an RFID location tag.

21. The system of claim 19, wherein the software provides a signal to user through the user interface when a forklift carrying an RFID-tagged pallet approaches a correct RFID location tag.

22. The system of claim 19, wherein the software provides a signal to a user through the user interface when a forklift carrying an RFID-tagged pallet approaches an incorrect RFID location tag.

23. The system of claim 12, wherein the forklift includes at least one sensor to activate an RFID interrogation system automatically.

24. The system of claim 12, wherein the forklift includes a deactivation system to turn off the RFID interrogation system automatically if no RFID tag has been successfully interrogated for a predetermined period of time.

* * * * *

UNITED STATES PATENT AND TRADEMARK OFFICE
CERTIFICATE OF CORRECTION

PATENT NO. : 6,669,089 B2
DATED : December 30, 2003
INVENTOR(S) : Eric R. Cybulski et al.

It is certified that error appears in the above-identified patent and that said Letters Patent is hereby corrected as shown below:

Title page,
Insert Item

-- [73] Assignee: 3M Innovative Properties Company
St. Paul, MN --

Column 3,
Line 7, "hack" should read -- edge --.

Column 11,
Line 62, "1" should read -- 6 --.

Signed and Sealed this

Twelfth Day of October, 2004

JON W. DUDAS
*Director of the United States Patent and Trademark Office*